United States Patent
Davidovici

(10) Patent No.: US 9,167,167 B2
(45) Date of Patent: Oct. 20, 2015

(54) SYSTEM AND METHOD FOR HIGH DYNAMIC RANGE IMAGE SENSOR SENSITIVE ARRAY

(75) Inventor: Sorin Davidovici, Oceanport, NJ (US)

(73) Assignee: RJS TECHNOLOGY INC., Hollis, NH (US)

(*) Notice: Subject to any disclaimer, the term of this patent is extended or adjusted under 35 U.S.C. 154(b) by 659 days.

(21) Appl. No.: 12/866,763

(22) PCT Filed: Feb. 25, 2008

(86) PCT No.: PCT/US2008/054828
§ 371 (c)(1),
(2), (4) Date: Aug. 9, 2010

(87) PCT Pub. No.: WO2009/108182
PCT Pub. Date: Sep. 3, 2009

(65) Prior Publication Data
US 2010/0328512 A1  Dec. 30, 2010

(51) Int. Cl.
*H04N 5/235* (2006.01)
*H04N 5/355* (2011.01)
*H04N 3/14* (2006.01)

(52) U.S. Cl.
CPC ........... *H04N 5/235* (2013.01); *H04N 3/155* (2013.01); *H04N 5/2355* (2013.01); *H04N 5/35563* (2013.01)

(58) Field of Classification Search
CPC ..... H04N 5/335; H04N 5/235; H04N 5/2351; H04N 5/2355; H04N 5/35563; H04N 3/155
USPC ............ 348/294, 297, 302, 315, 222.1
See application file for complete search history.

(56) References Cited

U.S. PATENT DOCUMENTS

| | | | |
|---|---|---|---|
| 6,211,915 B1* | 4/2001 | Harada | 348/298 |
| 6,831,692 B1* | 12/2004 | Oda | 348/315 |
| 7,400,355 B2* | 7/2008 | Tamaru et al. | 348/297 |
| 7,492,400 B2* | 2/2009 | El Gamal et al. | 348/296 |
| 7,750,278 B2* | 7/2010 | Oike et al. | 250/208.1 |
| 2008/0112651 A1* | 5/2008 | Cho et al. | 382/312 |
| 2008/0278610 A1* | 11/2008 | Boettiger | 348/273 |

* cited by examiner

*Primary Examiner* — Nhan T Tran
(74) *Attorney, Agent, or Firm* — Anderson Gorecki & Rouille LLP

(57) ABSTRACT

A method is disclosed of a heterogeneous image sensor array comprising more than one image sensor structures that are interconnected. The final image sensor array image output for each image sensor structure or pixel is computed using single image sensor structure output data or output data from more than one image sensor structures. The heterogeneous array exhibits complexity, cost, power consumption, device yields and reliability benefits when compared to other image sensor array structures.

10 Claims, 11 Drawing Sheets

SYSTEM AND METHOD FOR HIGH DYNAMIC RANGE IMAGE SENSOR SENSITIVE ARRAY

FIELD OF THE INVENTION

The present invention is related generally to the field of image sensors and more particularly to an image sensor array comprised of one or more active and/or passive image sensor structures such that a greatly extended voltage-to-light response can be obtained with each image sensor structure.

BACKGROUND OF THE INVENTION

Photography is the process of making pictures by means of the action of light. Light is the commonly used term for electromagnetic radiation in a frequency range that is visible to the human eye. Light patterns reflected or emitted from objects are recorded by an image sensor through a timed exposure. Image sensors can be chemical in nature, such as photographic film, or solid state in nature, such as the CCD and CMOS image sensors employed by digital still and video cameras.

Digital cameras have a series of lenses that focus light to create an image of a scene. But instead of focusing this light onto a piece of film, as in traditional cameras, it focuses it onto the image sensor which converts the electromagnetic radiation of the light into an electrical charge. The image sensor is said to be a picture element, or a 'pixel.' The electrical charge indicates a relative intensity of the electromagnetic radiation as perceived by the image sensor, and generally is used to associate a light intensity value with the pixel.

FIG. 1 illustrates several components that may be included in one possible implementation 10 by which a natural scene is captured to form an electronic image. System 10 includes a signal source 100 and a signal processing chain that includes integrator 110, analog to digital converter (ADC) 120 and digital signal processor (DSP) 130.

The output of integrator 110, $V_{OUT}$, is input to ADC 120. ADC 120 performs the analog to digital conversion function. The analog to digital conversion function is well known in the art. The analog signal $V_{OUT}$ that is present at the input of ADC 120 is converted into signal $V_D$ that is present at the output of ADC 120. $V_D$ can assume one of a set of discrete levels usually but not always measured in units of volts. By way of example another unit of measure for the output of ADC 120 can be amperes.

By way of example signal source 100 could be a light intensity sensor that is used in a timed application, such as in a digital camera application where the sensor is exposed to the incoming light for a specific duration of time that is commonly referred to as the exposure time. The integrator 110 then serves the function of integrating the responses of sensor 100 caused by all photons received during the exposure time into one output value to be read out at the end of the exposure time. By way of example the integrator 110 output value could be a voltage measured in units of volts.

FIG. 2 is a simplified illustration of a potential image sensor structure block diagram. Signal source 1000 is a light sensor that by way of example could be a photodiode. Component 1040 is a simple integrator that by way of example could be a capacitor. The input to the integrator is the output of signal source 1000. Integrator 1040 is reset by switch 1050 which is in the closed position prior to starting the integration process. The ability to rapidly reset the state of integrator 1040 is an important aspect of the image sensor operation. At the start of the integration process switch 1050 opens and the voltage across integrator 1040 begins to change in response to the input signal originating from signal source 1000. At the end of the integration process switch 1030 closes and integrator output 1060, $V_{OUT}$, is sampled. FIG. 2 is an illustrative diagram and the implementation of other similar image sensor structures with identical functionality is well known to one skilled in the art.

In an alternative and equivalent mode of operation of the simplified image sensor structure block diagram of FIG. 2 the integrator embodied by way of example by capacitor 1040 is reset by switch 1050 to a high voltage V+ or POWER instead of to V− or GROUND. At the start of the integration process switch 1050 opens and the voltage across integrator 1040 begins to change in response to the input signal originating from signal source 1000. At the end of the integration process switch 1030 closes and integrator output 1060, $V_{OUT}$, is sampled.

The simplified block diagram of an image sensor structure illustrated in FIG. 2 by way of example is subject to some performance limitations. One such limitation, the dynamic range, is described here by way of example together with an explanation that gives insight into its causes. The integrator output 1060, $V_{OUT}$, cannot in general exceed the upper limit imposed by the available power supply voltage. Power supply voltages are decreasing in state-of-the-art equipment due to stringent power consumption requirements. Integrator output 1060 cannot exceed the power supply voltage and will saturate if the integrator output signal attempts to build up after reaching the power supply voltage level.

Saturation occurs when the output voltage reaches the available power supply voltage and is unable to respond to further changes in the input signal. Signal saturation causes system performance degradation. FIGS. 3A through 3C illustrate potential distortions at the output of a pixel structure consisting of light sensor 100 and integrator 110 due to the dynamic range limitation of the photosensitive element structure and more specifically of the integrator structure. They also illustrate potential distortions at the output of light sensor 1000 and integrator output 1060 due to the dynamic range limitations. Segment (a) of FIG. 3(a) illustrates the linear increase of integrator 110 output in response to a constant input signal of different level. It also illustrates the linear increase of integrator output 1060 in response to a constant input signal of different level. The image sensor structure will perform well for the range of input light intensities that give rise to the linear output of segment (a); the image sensor structure will not perform well for the range of input light intensities that give rise to the saturated output of segment (b).

The integrator output response is indicative of limited dynamic range. As illustrated in FIG. 3(a) one version of the embodiment of the image sensor of FIG. 2 will render well shadow detail but will fail to render highlight detail. It is possible to shift the response as illustrated in FIGS. 3(b) and 3(c). In FIGS. 3(b) and 3(c) the dynamic range of the image sensor remains the same but the response characteristic is shifted. The response characteristic of FIG. 3(b) loses shadow and highlight detail but retains good midrange response. The response characteristic of FIG. 3(c) looses shadow detail and partial midrange detail in order to maintain good highlight detail.

FIG. 4A illustrates the histogram of the pixel intensities of an overexposed image capture where a multitude of image sensors that were exposed to the image were driven into saturation. As seen in FIG. 4A the maximum image sensor structure output value is '255' and the units used are the ADC 120 output corresponding to the image sensor output voltage. The light intensity caused many light sensors 100 to output a value that saturated the integrator 110 as the exposure progressed during the exposure period. The maximum (saturated) value of the output of integrator 110 caused the ADC to generate the output code '255' which is the maximum output code for an 8-bit ADC. The image capture will be of lower than optimal quality due to the inability of those image sensors subject to high intensity light inputs to achieve a sufficiently high output level.

The distortion illustrated in the histogram of FIG. 4A corresponds to the individual pixel distortion. A lower exposure time would have caused the outputs of the image sensors subject to high intensity light inputs to register an output level below 255 and avoid the high end distortion but would have prevented the image sensors subject to low intensity light inputs to remain at an output level value of 0 and not register the light intensity details contained in the shadows and other low light image segments.

FIG. 4B illustrates the histogram of the pixel intensities of an underexposed image capture where a multitude of image sensors were not exposed to sufficient light to achieve a minimum output value above '0'. As seen in FIG. 14B the minimum image sensor structure output value is '0'. The units refer to the ADC 120 output levels corresponding to individual image sensor structures. The light intensity received at the image sensor caused many individual light sensors 100 to output a value that failed to cause integrator 110 to output a sufficiently high value to cause a minimal ADC output code above '0' as the exposure progressed during the exposure period. The image capture will be of lower than optimal quality due to the inability of those image sensors subject to low intensity light inputs to generate a sufficiently high response level. The distortion illustrated in the histogram of FIG. 4B corresponds to the individual pixel distortion. A longer exposure would have caused the outputs of the individual image sensors subject to low intensity light inputs to register an above '0' output and avoid the low end distortion but would have also caused the image sensors structures subject to high intensity light inputs to saturate at a '255' output value and not register the light intensity details contained in the highlights and other bright light image segments.

FIG. 5A illustrates the response of yet another of the two or more solid-state image sensor structures used to build the heterogeneous image sensor disclosed in this patent application. The extended dynamic range of the solid-state image sensor structure is sufficient to produce an image sensor response over the full range of electromagnetic radiation intensity impinging upon the image sensor structure. This enables the solid-state image sensor structure to capture sufficient charges in the darkest portion while avoiding the saturation affects in the brightness portions of the image to be captured. The net effect it is faithful reproduction of the image to be captured regardless of whether the light from the darkest segment or the light from the brightest segment of the scene to be captured is impinging upon the image sensor. FIG. 5B illustrates the histogram of the pixel intensities of a correctly exposed image capture where all image sensor outputs are within the dynamic range of the 8-bit ADC that is '0' to '255'.

Integrator saturation before the end of the exposure period is a limiting factor in the dynamic range of an image sensor structure. Solutions to the integrator saturation problem have been published. The feature the published solutions have in common is the monitoring of the integrator output to detect the onset of saturation condition at which time the integrator is discharged and the event is recorded.

By way of example of such solutions Mazzucco discloses in U.S. Pat. No. 6,407,610 methods to prevent saturation of the integrator output. The prevention methods consist of sensing the onset of saturation and resetting (discharging) the integrator or changing the direction of integration when the onset of saturation is sensed. An external circuit records all such events. At the end of the integration period the effective full range of the integration is reconstructed from the number of recorded reset events and from the final integrator output voltage. A similar approach is disclosed by Merill in U.S. Pat. No. 6,130,713.

All such solutions have in common the need to compensate for the dynamic range limitation inherent to the native image sensor structure. These solutions require the introduction of additional circuit elements into the image sensor structure in order to perform the functions outlined in the disclosures.

These solutions have in common the independent operation of each image sensor with respect to other image sensors and the need to incorporate the additional circuit elements into each image sensor capable of extended dynamic range performance. The introduction of the additional circuit elements causes complexity, cost and power consumption to increase while the device yields and reliability decrease.

SUMMARY OF THE INVENTION

The present invention aims to disclose an image sensor array comprised of one or more active and/or passive image sensor structures such that a greatly extended voltage-to-light response can be obtained with each single image sensor structure.

The present invention further aims to disclose an image sensor array that is not homogenous but is heterogeneous and is comprised of two or more distinct and different active and/or passive image sensor structure such that a greatly extended voltage-to-light response can be obtained from and by the image sensor structures in one single image scan.

The present invention further aims to disclose active and/or passive image sensor structures that interact with one or more additional image sensor structures such that a greatly extended voltage-to-light response can be obtained from and by the image sensor structures in one single image scan.

The present invention further aims to disclose interactions between two or more active and/or passive image sensor structures such that a greatly extended voltage-to-light response can be obtained from and by the image sensor structure in one single image scan.

The present invention further aims to disclose a method of capturing and generating an electronic image representation from an image sensor array of two or more image sensor structures that interact during the active image capture period that is sometimes but not always referred to as the 'exposure' period such that a greatly extended voltage-to-light response can be obtained in one single image scan from the image sensor that aggregates the image sensor structures.

Accordingly, besides the objects and advantages of the enhanced array of two or more image sensor structures described in herein, several objects and advantages of the present invention include:
 1. to accurately capture the detail present in the darkest portions of the image to be captured in electronic format;
 2. to accurately capture the detail present in the brightest portions of the original image to be captured in electronic format;
 3. to accurately capture the detail present along all portions of the original image to be captured in electronic format;
 4. to operate with a dynamic range that is sufficiently large to electronically capture images of realistic scenes without losing accuracy at any point of the original scene and along the corresponding electronic signal range;

5. to exhibit a transfer function response characteristic that is highly accurate and can be mapped into another and arbitrary transfer function response characteristic without losing accuracy at any point along the range of signals that comprise the electronic representation of the original nature scene;
6. to exhibit a transfer function response characteristic that is highly accurate and can be mapped into another and arbitrary response characteristic without losing accuracy in any portion of the scene that is captured in the electronic image representation;
7. to exhibit a transfer function response characteristic that can capture images of realistic nature scenes with sufficiently high accuracy to be matched to the transfer function response characteristic of one or more different display devices so that the original nature scenes look realistic and substantially identical to the original nature scenes when viewed on all display devices;
8. to exhibit a transfer function response characteristic that is highly accurate and can be used to create archival records that contain sufficient highly accurate information to enable future processing for matching the archival image to various future display devices that will have improved characteristics so that the original nature scenes will look realistic and substantially identical to the original nature scenes when viewed on the future display devices; and
9. to exhibit a response characteristic that is sufficiently accurate to enable the captured image to be effectively used in signal processing apparatus, such as facial recognition apparatus, quality inspection apparatus, scientific analysis apparatus and all other apparatus the performance of which depend on the quality of the electronic image capture of images visible in the spectral ranges to which the human eye is sensitive or in other spectral ranges to which the human eye is not sensitive and therefore the image would be invisible to the human eye.

Further objects and advantages of the invention will become apparent from a consideration of the drawings and ensuing description.

DETAILED DESCRIPTION OF THE INVENTION

Figure 1:
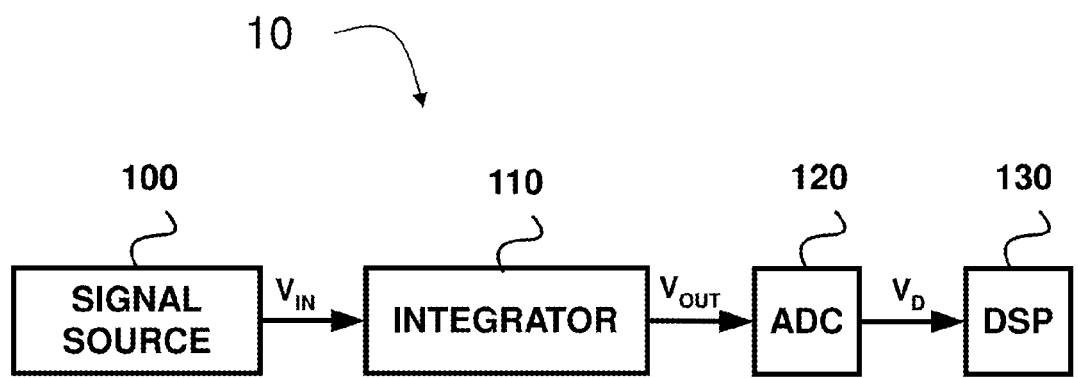
FIG. 1 illustrates the simplified block diagram of a typical system used to capture and process electronic images in digital format.

According to one aspect of the invention, a heterogeneous image sensor array is described that in some applications may also be referred to as a focal plane array (FPA). It comprises individual image sensor structures that in some application may also be referred to as focal plane detectors (FPD).

The image sensor structures that comprise the image sensor array are heterogeneous and consist of a number of image sensor structures. The number of image sensor structures in the image sensor array is at least two. The image sensor structures may be of varying types. Thus, there can be as many different image sensor structures in the image sensor array as there are image sensors, meaning that each individual image sensor structure can be different from each other individual image sensor structure. The number of image sensor structures and the number of different kinds of image sensor structures in the image sensor array can vary and will be determined by the requirements of specialized applications of the apparatus that contains the image sensor array.

Two or more of the image sensor structures that comprise the image sensor array interact during the image capture period. The current disclosure contemplates a heterogeneous image sensor array comprised of two or more image sensor structures, at least two having different levels of complexity. The more complex image sensor structures will have more circuit elements than the less complex image sensor structures, yet the less complex image sensor structures benefit through sharing of information provided by the more complex image structures. One benefit of such a heterogeneous image sensor array is lowered complexity, cost and power consumption and increased device yields and reliability. Generally the more complex image sensor structures that comprise the heterogeneous image sensor array will have functionality that is not present in the less complex image sensor structures that comprise the heterogeneous image sensor array, and are therefore able to obtain information that is not available to the less complex structures, but which may, with the present invention, be shared with the less complex structures.

Generally the less complex image sensor structures that comprise the heterogeneous image sensor array will have functionality that is reduced in comparison to the functionality of the more complex image sensor structures that comprise the heterogeneous image sensor array. The reduced functionality requires fewer circuit elements to implement the image sensor structure. Fewer circuit elements are a principal cause of the complexity, cost, power consumption, device yields and reliability benefits enjoyed by the heterogeneous image sensor array disclosed herein.

The heterogeneous image sensor array disclosed herein is capable of producing high-quality electronic images with high dynamic ranges even though not all image sensor structures that comprise it are individually capable of such high performance. This capability is derived from interactions of individual image sensor structures during the image capture stage.

The native or inherent dynamic range performance of an image sensor structure is governed by factors such as fabrication materials, design geometry, etc. The native dynamic range of an image sensor structure can be increased by adding circuit elements to perform function not normally available in image sensor structures not modified for high dynamic range performance. By way of example of such additional functions Mazzucco discloses in U.S. Pat. No. 6,407,610 sensing the onset of saturation and resetting (discharging) the integrator or changing the direction of integration when the onset of saturation is sensed. Similar functions are disclosed by Merill in U.S. Pat. No. 6,130,713.

FIG. 6 illustrates one high dynamic range image sensor structure and two low dynamic range image sensor structures that form an image sensor array or that are a part of one. The high dynamic range image sensor structure 1400 is labeled HDR. The low dynamic range image sensor structures 1410 and 1420 are labeled LDR #1 and LDR #2. The interconnect 1430 connects the HDR image sensor structure 1400 to the LDR image sensor structures 1410 and 1420. By way of example interconnect 1430 can consist of one or more signals that reach LDR #1 1410 and LDR #2 1420 in common or it can consist of one or more signals that reach LDR #1 1410 and LDR #2 1420 individually and are not common to LDR #1 1410 and LDR #2 1420 or it can further consist of one or more signals that reach LDR #1 1410 and LDR #2 1420 individually and are not common to LDR #1 1410 and LDR #2 1420 and of one or more signals that reach LDR #1 1410 and LDR #2 1420 in common. Heterogeneous image sensor arrays can contain as few as two image sensors, each of which having a different image sensor structure or of as many image sensors with any number of different image sensor structures as state of the art fabrication limitations allow.

The heterogeneous image sensor array is not constrained to be contained on a single fabricated device. In a heterogeneous image sensor array two or more image sensor structures could be connected and operating jointly and not independently. Thus a heterogeneous image sensor array can be fabricated and housed in different devices but interconnections between image sensor structures will be implemented so that the image sensor structures are not restricted to operate independently. Other potential implementation architectures for heterogeneous image sensor arrays are possible and known to those skilled in the art.

The HDR image sensor structure 1400 senses when its own internal or output state equals or approximately equals integer increments of the saturation level of the LDR image sensor structures 1410 and 1420. By way of example if the saturation level of the LDR image sensor structures 1410 and 1420 is labeled $V_{SAT}$ then the HDR image sensor structure 1400 would issue an indication when its own state equals $V_{SAT}$, $2 V_{SAT}$, $3 V_{SAT}$, and so on.

The output level of the LDR image sensor structures 1410 and 1420 labeled $V_{SAT}$ is a known level and need not be a saturation level. The meaning of the term saturation level is well known to one skilled in the art. If the output level of the LDR image sensor structures 1410 and 1420 increase in response to input stimuli the output level $V_{SAT}$ is not required to be precisely that level beyond which the outputs of LDR image sensor structures 1410 and 1420 cannot increase any further in a linear fashion in response to changes in the input stimuli. If the output level of the LDR image sensor structures 1410 and 1420 decrease in response to the input stimuli the output level $V_{SAT}$ is not required to be precisely that level beyond which the output s of LDR image sensor structures 1410 and 1420 cannot decrease any further in a linear fashion in response to changes in the input stimuli.

$V_{SAT}$ is an arbitrary level chosen in consideration of many practical design and operation factors such as available power supply voltages, specific circuit design features, power consumption considerations, required image sensor array performance and so on. HDR image sensor 1400 can identify when its own internal or output state equals $V_{SAT}$, $2 V_{SAT}$, $3 V_{SAT}$, and so on using a variety of means well know to those versed in the art. By way of example if HDR image sensor 1400 contains an integrator similar in nature to capacitor 1040 then it can identify when the voltage across capacitor 1040 equals $V_{SAT}$, $2 V_{SAT}$, $3 V_{SAT}$, and so on by means of standard comparators. Comparators are standard circuits well known to those well versed in the art.

By way of yet another example HDR image sensor 1400 could contain a frequency domain integrator where an input signal causes an oscillator to change frequency and the integration process includes determining the phase traversed by the oscillator output. Then $V_{SAT}$, $2 V_{SAT}$, $3 V_{SAT}$, and so on can be determined to occur at those times at which the phase traversed by the oscillator output increases by a predetermined quantity. Oscillators are standard circuits well known to those well versed in the art.

The number times that the internal or output state of HDR image sensor structure 1400 equals increments of $V_{SAT}$ such as by way of example $2V_{SAT}$, $3 V_{SAT}$ and so on can be recorded using standard digital or analog circuits.

By way of example a digital circuit that can be used for the purpose of the recording is a digital counter. A digital counter changes its design states in response to an input signal. Common digital counters outputs are comprised of a number of signal lines each able to take on two values that represent a logic LOW or a logic HIGH. A digital counter output comprised of M lines is capable of $L=2^M$ combinations and is therefore capable of counting up to $L=2^M$ events.

Figure 2:
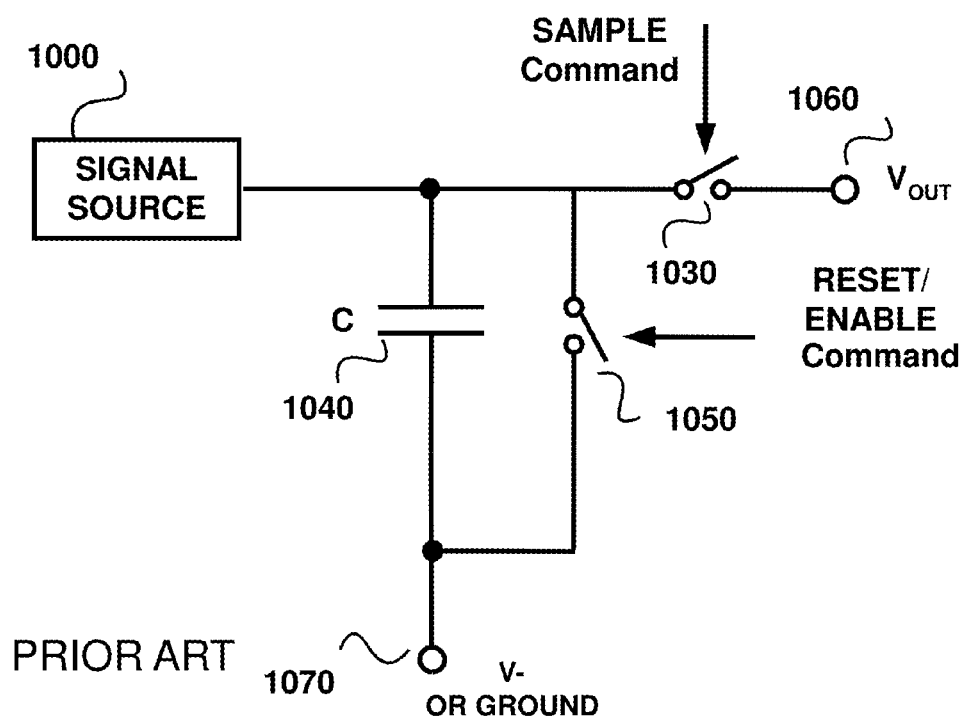
FIG. 2 illustrates in block diagram format a simple integrator with control switches.
Figure 3A:
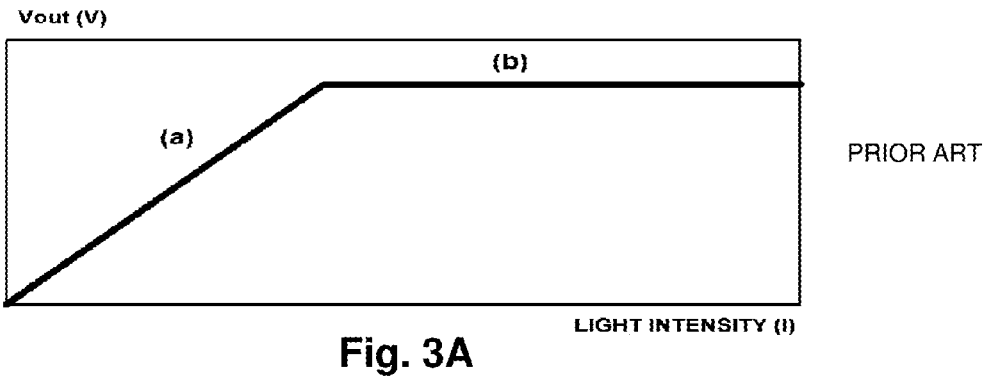
FIGS. 3(a), 3(b) and 3(c) illustrate the effects that limited dynamic range might have upon the output of a simple typical image sensor.
Figure 3B:
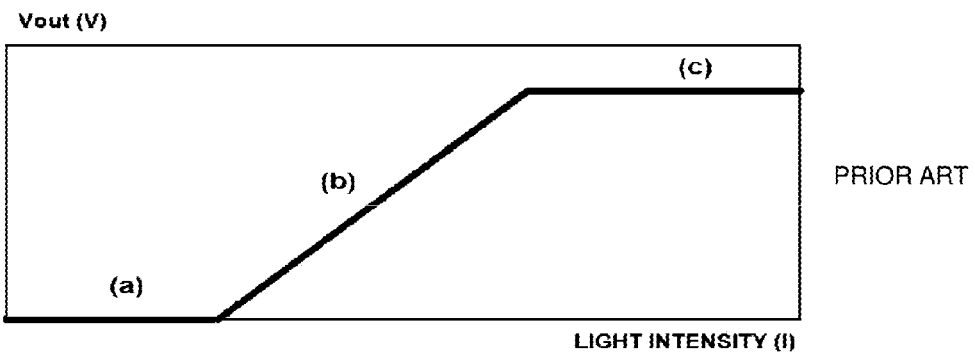
Figure 3C:
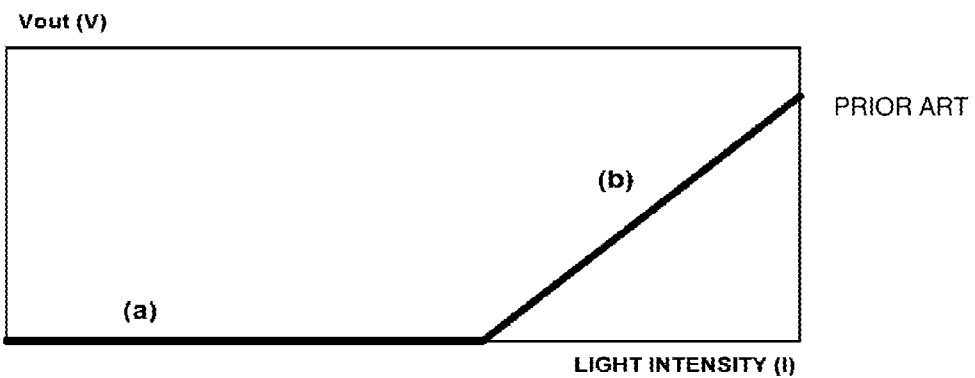
Figure 4A:
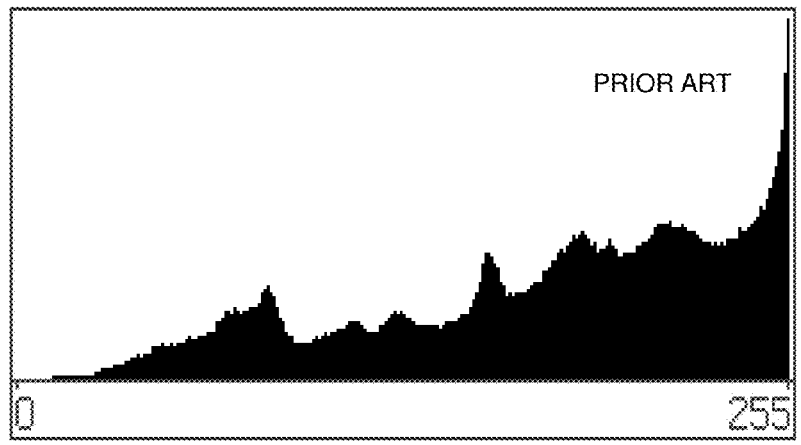
FIGS. 4(a) and 4(b) illustrate in histogram format the effects that limited dynamic range might have upon the output of a typical image sensor array.
Figure 4B:
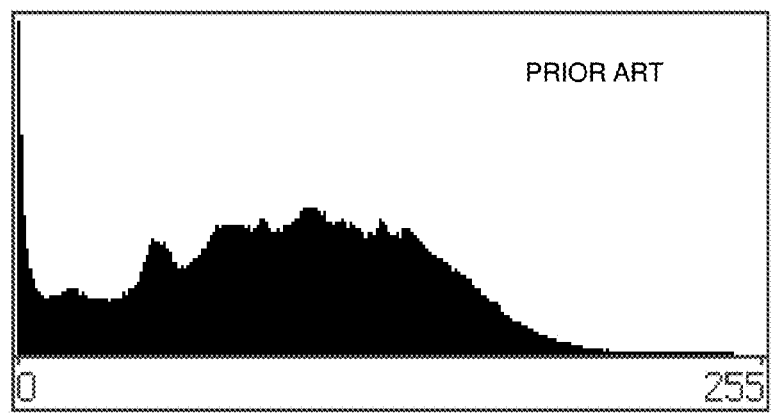
Figure 5A:
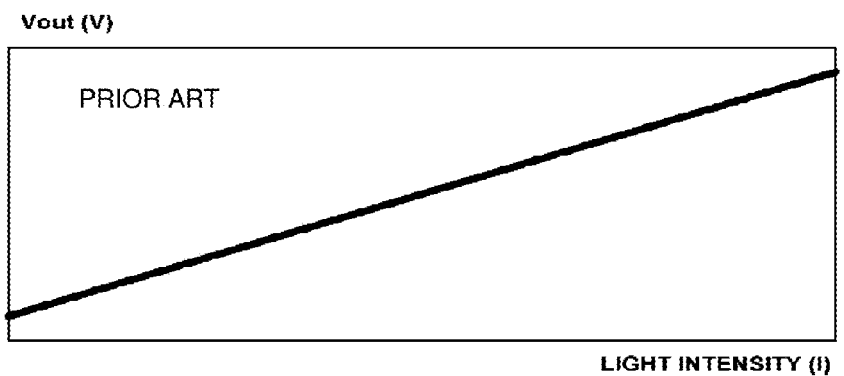
FIG. 5(a) illustrates the output of an image sensor that does not suffer from dynamic range limitations.
Figure 5B:
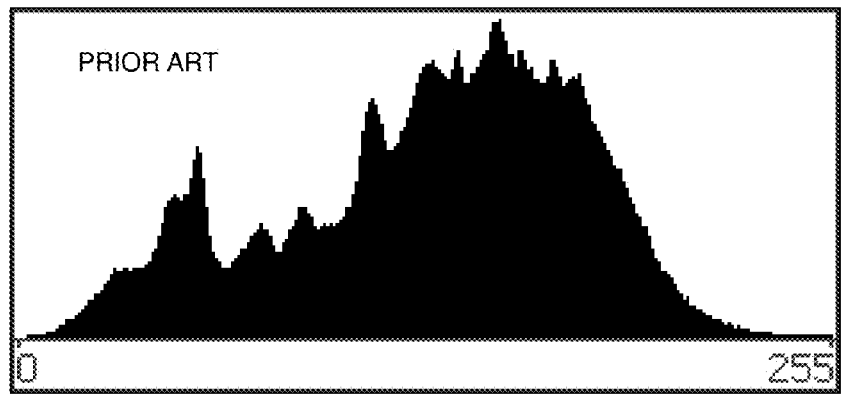
FIG. 5(b) illustrates in histogram format the output of a typical image sensor array that does not suffer from dynamic range limitations.
Figure 6A:
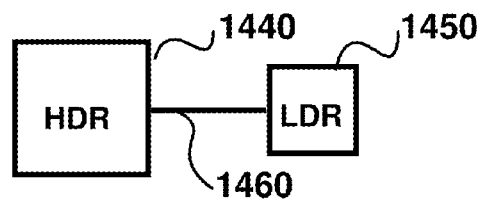
FIG. 6 illustrates a hypothetical image sensor array consisting of heterogeneous image sensor structures and the interconnections between the image sensor structures.
Figure 6B:
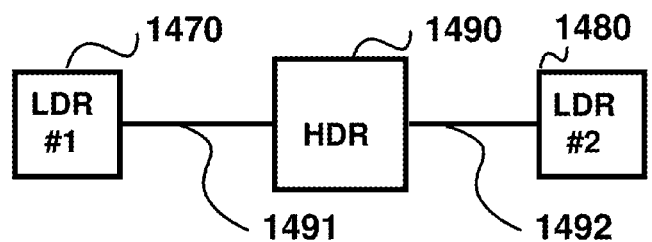
Figure 6C:
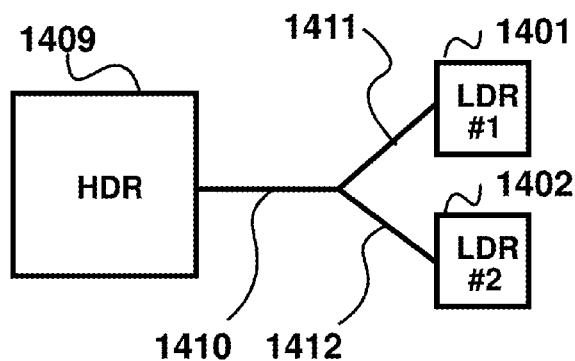
Figure 6D:
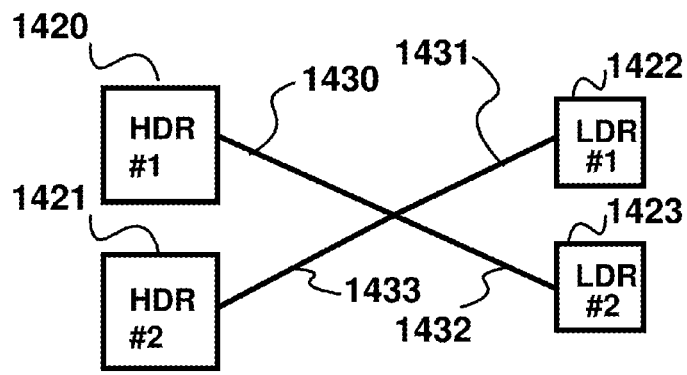

Digital counters are relatively large circuits to implement and are expensive in terms of silicon real estate required for implementation. An alternative and advantageous means to implement a circuit capable of keeping count of a number of events is an analog storage circuit. An analog storage circuit is a circuit that is able to retain its value for some period of time. By way of example a simple analog storage circuit is an analog integrator such as illustrated by capacitor 1040 in FIG. 2. Capacitor 1040 stores a charge that is increased or decreased by signal source 1000. Its output is read when switch 1030 closes and $V_{OUT}$ 1060 equals the voltage across the capacitor. $V_{OUT}$ 1060 represents the integrated value of the output of signal source 1000.

The output voltage of an integrator exemplified here by capacitor 1040 can change in discrete increments $\Delta V$ in response to input stimuli designed to cause these changes. By way of example such an input stimuli might be a signal source that causes current flow into the integrator to occur with a small duty cycle such that the current flows for a short time than it stops. Other such signals are well known to one skilled in the art.

The output voltage of an integrator subject to inputs from such a signal source would only assume a subset of all possible output values at the time that it is read out. By way of example let signal source 1000 be a signal source that causes change in discrete increments ΔV across capacitor 1040. The output 1060 of capacitor 1040 then changes in discrete increments ΔV in response to stimuli from signal source 1000. By way of example the voltage 1060 across capacitor 1040 can start from an initial value $V_{MIN}$ volts and increase by discrete values of ΔV to $V_{MIN}$+ΔV, $V_{MIN}$+2 ΔV, $V_{MIN}$+3 ΔV and so on until it reaches a maximal value $V_{MAX}$ volts. By way of yet another example the voltage 1060 across capacitor can start from an initial value $V_{MAX}$ volts and decrease by discrete values ΔV, to $V_{MAX}$−ΔV, $V_{MAX}$−2 ΔV, $V_{MAX}$−3 ΔV and so on until it reaches a minimum value $V_{MIN}$ volts. Circuits and means to effect the initial capacitor voltage and the subsequent discrete changes in voltage are not new and are well known to one skilled in the art.

Knowledge of the initial capacitor voltage $V_{MIN}$ or $V_{MAX}$ together with knowledge of the state of the voltage across capacitor 1040 at any given time can be used to derive the number of discrete incremented or decremented voltage changes ΔV that occurred since the application of the initial voltage.

Capacitor 1040 was used in the presentation of the analog counter storage above by way of example. Other analog storage components and techniques can be used to implement similar analog storage means. These techniques and means are well known to one versed in the art.

Analog storage means are advantageous in some circumstances. Current fabrication processes are able to fabricate devices where the analog storage means such as capacitor 1040 are fabricated in collocation with other circuit elements such as transistors. This fabrication technique is advantageous as it reduces the silicon area required to build the image sensor structure and consequently the image sensor array.

The collocation of the analog storage device given here by way example as capacitor 1040 is made possible by the multiple layer techniques used in the design and fabrication of integrated circuits. These techniques are well known to one skilled in the art. Consequently the collocation of the analog storage device given here by way example as capacitor 1040 can be achieved by placing the analog storage device above other circuit elements given here by way of example as transistors during the fabrication process. Alternately the collocation of the analog storage device given here by way example as capacitor 1040 can be achieved by placing the analog storage device under other circuit elements given here by way of example as transistors during the fabrication process.

FIG. 6 illustrates interconnect 1430 between the HDR image sensor structure 1400 and LDR image sensor structures 1410 and 1420. The interconnect 1430 can contain more than one signal. By way of example one signal present on the interconnect 1430 might be the indication when the internal or output state of HDR image sensor structure 1400 equals $V_{SAT}$, 2 $V_{SAT}$, 3 $V_{SAT}$, and so on.

Figure 7:
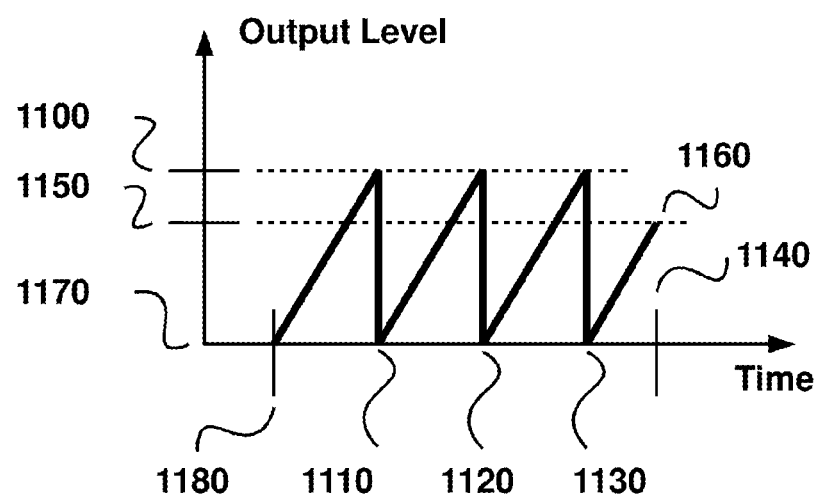
FIG. 7 illustrates a potential output of a lower dynamic range image sensor structure of a heterogeneous image sensor array as a function of time.

The operation of interconnected image sensor structures 1400, 1410 and 1420 will be affected by interconnect signals 1430. Independent operation of image sensor structures 1400, 1410 and 1420 will be different from interdependent and interconnected operation. By way of example the output of LDR image sensor structures 1410 and 1420 in one such mode of operation is illustrated in FIG. 7. Time instance 1180 marks the beginning of the image capture period and the output levels of LDR image sensor structures 1410 and 1420 increase in response to the intensity of light impinging upon them. At time instances labeled 1110, 1120 and 1130 the state of HDR image sensor structure 1400 approximately equals $V_{SAT}$, 2 $V_{SAT}$, 3 $V_{SAT}$ and these events are communicated via signals on interconnect 1430. In response to these events LDR image sensor structures 1410 and 1420 reset their output state. The output level of LDR image sensor structures 1410 and 1420 are indicated by the level marked 1100 immediately prior to the reset actions. By way of example in a previous example the reset action was accomplished by closure of switch 1050. Different image sensor structures and different methods of accomplishing image sensor output reset actions are well known to one skilled in the art.

The output state of LDR image sensors 1410 and 1420 at time instances 1110, 1120 and 1130 need not be equal to each other or to the output level marked 1100. The output level marked 1100 may be lower, equal to or higher than $V_{SAT}$, the state of HDR image sensor structure 1400 that triggered the reset action.

Following the reset action the output state of LDR image sensors 1410 and 1420 changes to the level labeled 1170. The level labeled 1170 can be any predetermined level and need not equal GROUND or '0' volts.

Time instance 1140 marks the end of the image capture period. At that time the output level of LDR image sensor structures 1410 and 1420 are indicated by way of example as the output level marked 1150. The output level of LDR image sensor structures 1410 and 1420 at time instance 1140 need not equal each other and need not equal the output level marked 1150.

The output state of some or all image sensor structures contained within the image sensor array are retrieved at the end of the image capture period marked in FIG. 7 as time instance 1140 and processed to generate the electronic image of the captured scene.

The output state of the image sensor structures can consist of any number of information items. By way of example the information item retrieved from LDR image sensor structures 1410 and 1420 is their individual output level at time instance 1140 while the information items retrieved from HDR image sensor structure 1400 are its individual output level at time instance 1140 as well as the number of times its output level reached an integer multiple of $V_{SAT}$ during the image capture period. The information defining the output state of the image sensor structures is not limited to that given here by way of example; it can consist of any number of items of information that are well known to one skilled in the art.

Figure 8:
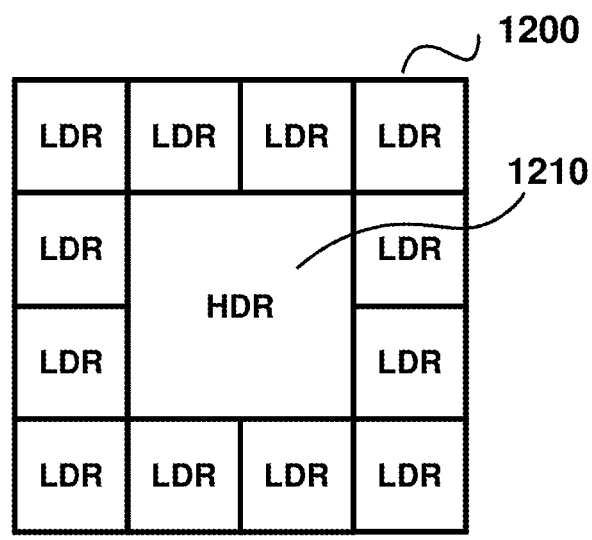
FIG. 8 illustrates a small heterogeneous image sensor array or a segment of a larger heterogeneous image sensor array consisting of collocated image sensor structures.

FIG. 8 illustrates by way of examples an image sensor array or an image sensor array section that includes 13 collocated image sensor structures. The HDR image sensor 1210 structure is located in the center and 12 LDR image sensors, one of which is labeled 1200, surround the HDR image sensor structure. The HDR image sensor 1210 is larger than the LDR image sensor structures due to the additional circuit elements required by its additional functional capabilities. This array configuration is shown by way of example and other configurations are possible and are well know to one skilled in the art.

Figure 9:
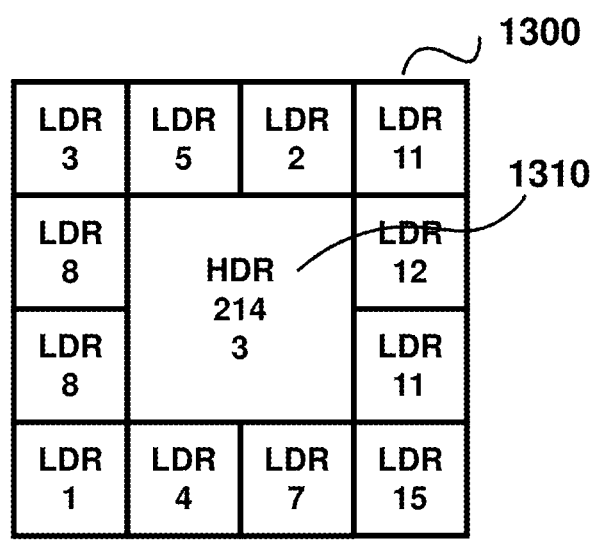
FIG. 9 illustrates a potential output state of image sensor structures at the end of the image capture period.

FIG. 9 illustrates by way of example the image sensor array state at the time instance that marks the end of the image capture period 1140. It shows the final output state $V_{FINAL\_LDR}$ at time instance 1140 of each LDR image sensor structures of which LDR image sensor structure 1300 is an instantiation. The output level of image sensor structure 1300 at time instance 1140 is shown to be '11'. Other LDR image sensor structures reach different output levels at time instance 1140 and are shown by way of example in FIG. 10 to vary between '1' and '15' decimal.

Figure 10:
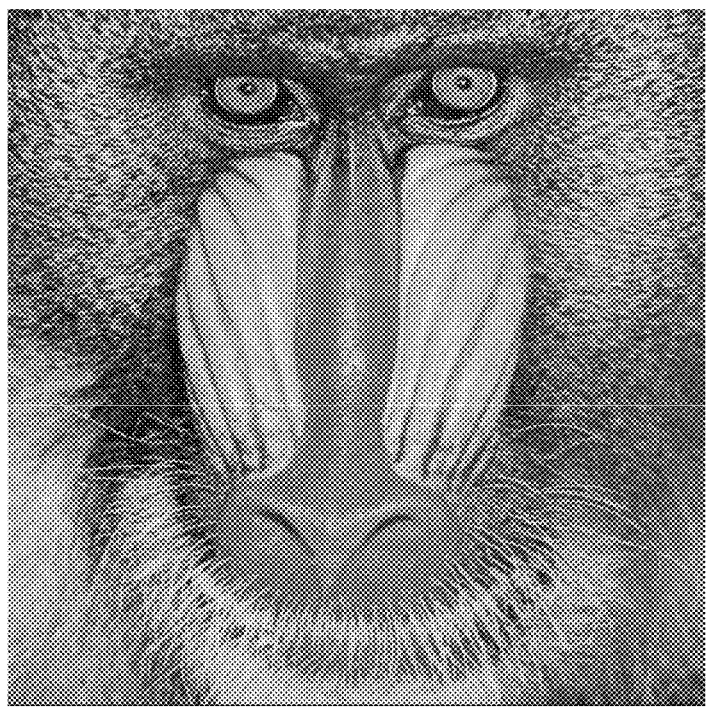
FIG. 10 illustrates a well known test picture that is used to illustrate the image capture quality of a sample heterogeneous image sensor array.

HDR image sensor structure 1310 generates two items of information at time instance 1140: $V_{FINAL\_HDR}$, its output level at time instance 1140 and $N_{SAT}$ the number of times its output level reached an integer multiple of $V_{SAT}$ during the image capture period. These items are shown in FIG. 10 to be '214' and '3' decimal respectively.

The electronic image is generated from these items of information. The process used to generate the electronic image from these items of information is not unique. By way of example one process labeled PROCESS_1 is described for the image sensor structure block of FIG. 9 as follows:

1. Retrieve the items associated with all image sensor structures
2. For each HDR image sensor structures compute an output level according to $V_{OUT\_HRD} = N_{SAT}*V_{SAT} + V_{FINAL}$
3. For each LDR image sensor structure the output level is $V_{FINAL}$, its output level at time instance 1140, $V_{OUT\_HDR} = V_{FINAL}*N_{SAT}$.
4. If required filter the electronic image formed by the outputs of the image sensor structures.

Yet another process labeled PROCESS_2 is described for the image sensor structure block of FIG. 9 as follows:

1. Retrieve the items associated with all image sensor structures
2. For each HRD image sensor structures compute an output level according to $V_{OUT\_LDR} = N_{SAT}*V_{SAT}*V_{FINAL\_LDR}/V_{FINAL\_HDR} + V_{FINAL}$
3. For each LDR image sensor structure the output level is $V_{FINAL}$, its output level at time instance 1140, $V_{OUT} = V_{FINAL}*N_{SAT}$.

If required, filter the electronic image formed by the outputs of the image sensor structures."

Other processes exist and are well-known to those skilled in the art.

Figure 11A:
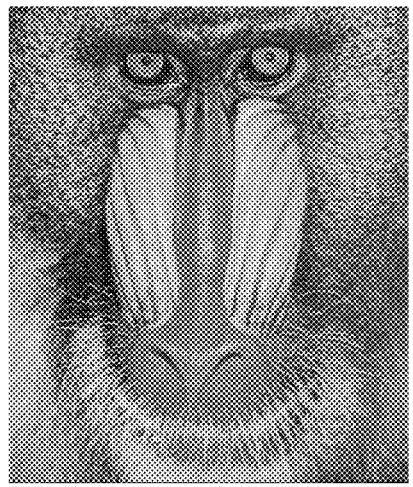
FIG. 11(a) illustrates the electronic image generated by a first sample process from the output of the heterogeneous image sensor array.
Figure 11B:
FIG. 11(b) illustrates the difference between the original image and the image generated by a first process from the output of the heterogeneous image sensor array.
Figure 11C:
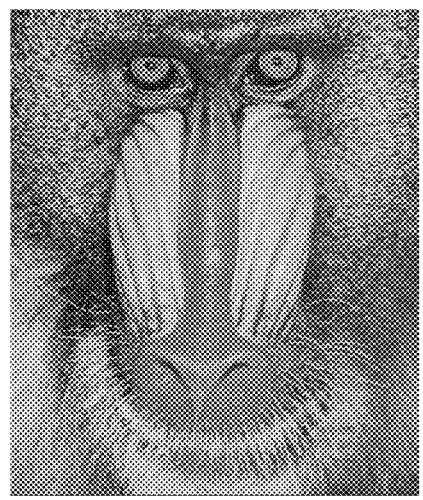
FIG. 11(c) illustrates the electronic image generated by a second sample process from the output of the heterogeneous image sensor array.
Figure 11D:
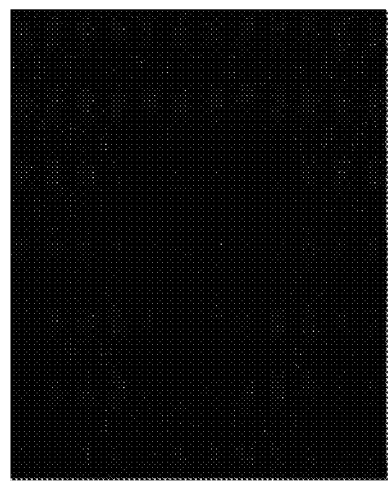
FIG. 11(d) illustrates the difference between the original image and the image generated by a second process from the output of the heterogeneous image sensor array.

FIG. 10 illustrates a well-known test picture and FIGS. 11A and 11C illustrate the electronic images captured by the heterogeneous image sensor, a segment of which is illustrated in FIG. 8 for the case in which the parameter $N_{SAT}=16$ and final filtering is not applied. FIG. 11A is an electronic image generated by PROCESS_1. FIG. 11B is the difference between original image and electronic image generated by PROCESS_1. FIG. 11C is the electronic image generated by PROCESS_2 and FIG. 11D is the difference between original image and electronic image generated by PROCESS_2. The present invention is related to a method for obtaining a read-out signal of a lower dynamic range solid-state image sensor structure, including CMOS and MOS based image sensor structures, having at least a photosensitive element with an output node, means to reset the output node signal and means to read out the output node signal.

Accordingly systems and methods have been described for the creation of electronic images using heterogeneous image sensor structures, where each individual image sensor structure content is generated as a function of the information captured by two or more image sensors structures during one single image scan, or exposure.

Having described various embodiments of the invention, it will be appreciate that although certain components and process steps have been described the descriptions are representative only; other functional delineations or additional steps and components can be added by one of skill in the art, and thus the present invention should not be limited to the specific embodiments disclosed. The various representational elements may be implemented in hardware, software running on a computer, or a combination thereof and modification to and variation of the illustrated embodiments may be made without departing from the inventive concepts herein disclosed. Accordingly, the invention should not be viewed as limited except by the scope and spirit of the appended claims.

What is claimed is:

1. An image sensor array comprising multiple individual image sensors each sensitive to electromagnetic radiation used to sense electromagnetic radiation from an external scene and from this sensing create the electronic representation of the external scene during an image capture process, wherein the image sensor array comprises a plurality of communicating image sensors of different complexities in terms of number of circuit elements associated with dynamic range and wherein the plurality of image sensors are organized into image sensor sub-arrays, at least one of which comprises a first image sensor which prompts reset of output state of a second image sensor.

2. The image sensor array of claim 1 wherein at least one of the image sensor subarrays is comprised of two or more said individual image sensors.

3. The image sensor array of claim 1 wherein said image sensor subarray is comprised of two or more individual image sensors of which at least one of said individual sensors is selected from a group including a first image sensor capable of selecting a highest response output from one or more connected, communicating image sensor outputs and a second image sensor is incapable of selecting a highest response output from one or more connected, communicating image sensor outputs, wherein the image sensor outputs are generated in response to input electromagnetic radiation stimuli.

4. The image sensor array of claim 1 wherein said image sensor subarrays are comprised of two or more individual image sensors, at least two of which are coupled to exchange information.

5. An image sensor array comprising multiple individual image sensors each sensitive to electromagnetic radiation used to sense electromagnetic radiation from an external scene and from this sensing create the electronic representation of the external scene, the image sensor array comprising multiple kinds of individual image sensors of uneven complexities in terms of number of circuit elements associated with dynamic range and at least a subset of said individual image sensors of uneven complexities coordinate their mode of operation during the image capture process via communications between individual image sensors, comprising one or more image sensors of a first kind capable of generating a high dynamic range output in response to input electromagnetic radiation stimuli, and wherein all or a subset of the high dynamic range image sensors of the first kind comprise a signal bus that extends externally from the said image sensors of the first kind and connects to one or more image sensors of a second kind of the image sensor array such that at least two image sensors which differ in kind coordinate their mode of operation during the image capture process using information contained on the signal bus.

6. The image sensor array of claim 5 comprising one or more image sensors of a second kind capable of selecting a highest response output from outputs of one or more communicating, connected image sensors of a first kind, the outputs of the communicating, connected image sensors of the first kind being generated in response to input electromagnetic radiation stimuli, wherein the one or more image sensors of the first kind comprise a signal bus that extends externally from the said image sensors of the first kind and connects to the one or more image sensors of the second kind such that at least a subset of said one or more image sensors of the first and second kinds coordinate their mode of operation during the image capture process using information carried by the signal bus.

7. The image sensor array of claim 5 comprising one or more image sensors of a third kind that are incapable of selecting a highest response output from a plurality of communicating, connected image sensor outputs generated in response to input electromagnetic radiation stimuli, the one or more incapable image sensors of the third kind comprising a signal bus that extends externally from the incapable image sensors of the third kind and connects to one or more other image sensors of a first or second kind in the image sensor array such that at least a subset of image sensors in the array coordinate their mode of operation during the image capture process using information contained within the signal bus.

8. The image sensor array of claim 7 wherein the one or more image sensors of the third kind utilize connected image sensor outputs generated in response to input electromagnetic radiation stimuli to coordinate image acquisition with a subgroup of image sensors of a kind other than the third kind.

9. The image sensor array of claim 7 further comprising an image sensor that uses information received from a subgroup of image sensors to coordinate its image acquisition process via the signal bus.

10. The image sensor array of claim 7 further comprising an image sensor that uses its generated image acquisition information together with the image acquisition information from a subgroup of other image sensors to generate its final image acquisition information.

* * * * *